US012081078B2

(12) United States Patent
Baun et al.

(10) Patent No.: US 12,081,078 B2
(45) Date of Patent: Sep. 3, 2024

(54) STATOR FOR A PERMANENT-EXCITED ELECTRIC MOTOR/INDUCTION MACHINE

(71) Applicant: ebm-papst Mulfingen GmbH & Co. KG, Mulfingen (DE)

(72) Inventors: Martin Baun, Mulfingen (DE); Sebastian Mezger, Ingelfingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 110 days.

(21) Appl. No.: 17/578,582

(22) Filed: Jan. 19, 2022

(65) Prior Publication Data
US 2022/0231579 A1    Jul. 21, 2022

(30) Foreign Application Priority Data
Jan. 20, 2021    (DE) .................. 102021101162.0

(51) Int. Cl.
*H02K 11/01* (2016.01)
*H02K 1/14* (2006.01)
*H02K 11/33* (2016.01)
*H02K 21/16* (2006.01)

(52) U.S. Cl.
CPC ........... *H02K 11/014* (2020.08); *H02K 1/146* (2013.01); *H02K 11/33* (2016.01); *H02K 21/16* (2013.01)

(58) Field of Classification Search
CPC ........ H02K 1/185; H02K 21/16; H02K 11/33; H02K 11/014; H02K 11/0141; H02K 1/146
See application file for complete search history.

(56) References Cited

U.S. PATENT DOCUMENTS

2004/0232800 A1* 11/2004 Seguchi ................. H02K 16/02
                                                    310/266
2008/0211326 A1    9/2008 Kang et al.
2022/0311289 A1*  9/2022 Tavernier ............... H02K 1/185

FOREIGN PATENT DOCUMENTS

CN    111555483 A    8/2020
DE    1146184 B      3/1963
DE    4404585 C2     4/1998
(Continued)

OTHER PUBLICATIONS

JP-59070154-A machine translation on Jul. 1, 2023.*
(Continued)

*Primary Examiner* — Leda T Pham
(74) *Attorney, Agent, or Firm* — Harness, Dickey & Pierce, P.L.C.

(57) ABSTRACT

A permanent-excited electric motor/induction machine has a laminated core (1) made of stator laminations (11) and a yoke winding (2). The yoke winding (2) has an inner winding part (21) and an outer winding port 22. The inner winding part 21 is arranged radially inside the stator lamination (11) in at least one winding receptacle (3). The outer winding part (22) is arranged radially outside the stator lamination (11) on an outer surface (4) of the laminated core (1). A soft-magnetic shield (5) is formed on the entire circumference around the outer winding part (22). At least one nonmagnetic connecting element (6), that contacts the stator lamination (11) and the soft-magnetic shield ring (5), is arranged between the stator lamination (11) and the soft-magnetic shield (5).

7 Claims, 5 Drawing Sheets

(56) References Cited

FOREIGN PATENT DOCUMENTS

JP         59070154 A    *    4/1984             H02K 1/185
JP         S59-70154 A       4/1984

OTHER PUBLICATIONS

German Search Report from corresponding German Application No. 102021101162.0 mailed Feb. 18, 2022.
Extended European Search Report dated Jun. 21, 2022 in corresponding European Application No. 21215233.4, 8 pages.

* cited by examiner

STATOR FOR A PERMANENT-EXCITED ELECTRIC MOTOR/INDUCTION MACHINE

CROSS-REFERENCE TO RELATED APPLICATION

This application claims the benefit and priority of German Application No. 10 2021 101 162.0, filed Jan. 20, 2021. The entire disclosure of the above application is incorporated herein by reference.

FIELD

The disclosure relates to a stator for a permanent-excited electric motor/induction machine with a laminated core made of stator laminations and a yoke winding.

BACKGROUND

Overlapping winding systems are typically used for high-speed electric motors such as permanent magnet-excited synchronous machines or asynchronous machines. The small coil winding numbers required at high speeds result in small inductances. However, as a result, undesired harmonics arise in the phase current, from which elevated rotor losses result. These losses can be sufficiently large and require countermeasures. Appropriate countermeasures are typically passive low-pass filters, that are based on coils and capacitors. These solutions have the disadvantage in that, generally, a comparatively large installation space is required.

Another approach for countermeasures is the use of a multilevel inverter. Thus, the complexity is greatly increased in relation to the typically used inverter, however, and from which a greater space requirement also results.

SUMMARY

It is therefore an object of the present disclosure to provide a stator for a permanent-excited electric motor/induction machine with a laminated core made of stator laminations and a yoke winding. Here, operation at a pulse inverter is possible at a high speed with reduced rotor losses without current-smoothing auxiliary measures.

This object is achieved by the feature combination according to a stator for a permanent-excited electric motor/induction machine with a laminated core made of stator laminations and a yoke winding. The yoke winding comprises an inner winding part and an outer winding part. The inner part is arranged radially inside the stator lamination in at least winding receptacle. The outer winding part is arranged radially outside the stator lamination on an outer surface of the laminated core. A soft-magnetic shield is formed on the entire circumference around the outer winding part. At least one nonmagnetic connecting element contacts the stator lamination. The soft-magnetic shield ring is arranged between the stator lamination and the soft-magnetic shield.

According to the disclosure, a stator is proposed for a permanent-excited electric motor/induction machine with a laminated core made of stator laminations and a yoke winding. The yoke winding comprises an inner winding part and an outer winding part. The inner winding part is arranged radially inside the stator lamination in at least one winding receptacle. The outer winding part is arranged radially outside the stator lamination on an outer surface of the laminated core. In addition, a soft-magnetic shield is formed on the entire circumference around the outer winding part. Furthermore, at least one nonmagnetic connecting element is arranged between the stator lamination and the soft-magnetic shield. The nonmagnetic connecting element contacts the stator lamination and the soft-magnetic shield ring.

It is advantageous that the connection between the stator laminated core and the shield ring of the yoke-wound stator is resolved via a non-magnetically conductive connecting part. This pairing increases the leakage inductance and, at the same time, additionally prevents the undesired magnetic short-circuit between these two parts.

In one preferred embodiment of the disclosure, the laminated core is integrally formed. Thus, inductance and component strength of the laminated core of the stator are optimized.

Stators forming the species in the present technical area are typically designed in such a way that the inner winding part and the outer winding part are connected to one another via a stator yoke. This is a condition for a yoke winding, where a stator yoke is also referred to as a yoke.

In one advantageous embodiment variant, the at least one nonmagnetic connecting element is made of plastic. The nonmagnetic connecting element is arranged in each case between adjacent winding poles of the yoke winding. It is advantageous that the connecting element made of plastic meets the requirements with respect to nonmagnetic conductivity and is simple to produce and is optimally adaptable to the geometry of the stator lamination.

Furthermore, an embodiment is advantageous where the respective nonmagnetic connecting element is arranged spaced apart from the respective adjacent winding poles of the yoke winding. The desired effect of a nonmagnetic connecting element is thus achieved by a material-saving solution.

In an alternative embodiment of the present stator, the at least one nonmagnetic connecting element is a potting that is formed over the outer winding part. It is advantageous that the potting is formed over the entire circumference between the stator lamination and the shield ring. Thus, in addition to the nonmagnetic connection, the stator lamination is protected from moisture, dust, contamination, temperature influences, shocks, and touching. Also, electrical insulation is provided.

In a further advantageous embodiment, the at least one winding receptacle is formed as a groove. A toothed coil winding of the yoke winding is implementable in this way.

In one exemplary embodiment of the disclosure, the yoke winding is made 6-poled or 6-grooved. In a further advantageous embodiment of the stator, the yoke winding is made 12-poled or 12-grooved. The above embodiment variants of the yoke winding have optimal properties with respect to the use of the stator in an induction machine/permanent-excited electric motor.

Furthermore, an induction machine/permanent-excited electric motor with a stator corresponding to the above disclosure is proposed according to the disclosure where a rotor with permanent magnets is arranged inside the stator lamination. The induction machine/permanent-excited electric motor is functionally implemented in this way.

In one preferred embodiment of the induction machine/permanent-excited electric motor, it is connected directly to a 2-stage inverter. As a result of the increased inductance due to the stator, according to the disclosure of the induction machine/permanent-excited electric motor, the harmonics in the current are reduced. Thus, the motor is operable without additional measures directly at a 2-level inverter. The use of an upstream filter or the operation on a complex multilevel inverter is accordingly obsolete.

The above-disclosed features are combinable as desired, if this is technically possible and they are not contradictory to one another.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are characterized in the dependent claims or are described in more detail hereinafter together with the description of the preferred embodiment of the disclosure on the basis of the figures. In the figures:

DETAILED DESCRIPTION

Figure 1:
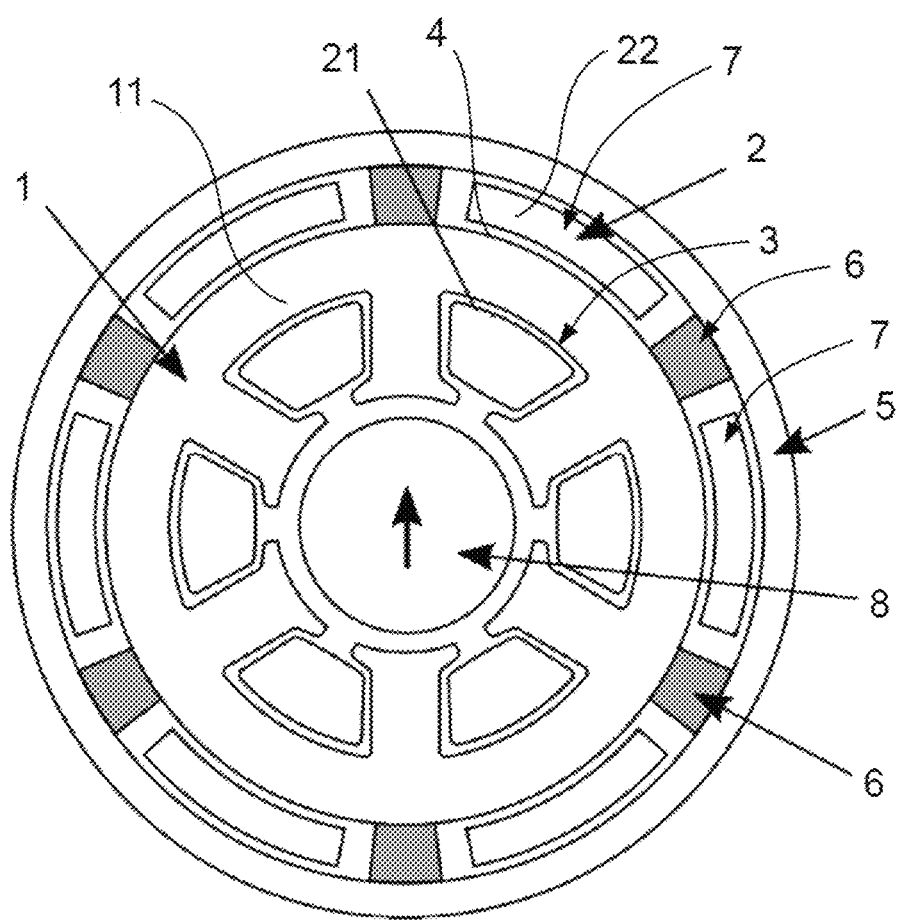
FIG. 1 is a schematic sectional view of an induction machine/permanent-excited electric motor with a rotor and a 6-pole or 6-groove stator with a soft-magnetic shield and a nonmagnetic connecting element.

Example embodiments will now be described more fully with reference to the accompanying drawings.

The figures are exemplary and schematic. The same reference numerals in the figures indicate the same functional and/or structural features.

FIG. 1 discloses a schematic sectional view of an induction machine/permanent-excited electric motor with a rotor 8 and a 6-pole or 6-groove stator that includes a soft-magnetic shield 5 and a nonmagnetic connecting element 6. The stator of the permanent-excited electric motor/induction machine comprises a laminated core 1 made of stator laminations 11 and a 6-pole or 6-groove yoke winding 2. In addition, the laminated core 1 is integrally formed.

Furthermore, the rotor 8 includes permanent magnets and is arranged inside the stator lamination 11. In addition, the induction machine/permanent-excited electric motor is directly connected to a 2-stage inverter (not shown).

Furthermore, the yoke winding 2 made 6-poled or 6-grooved includes, in each case, an inner winding part 21 and an outer winding part 22. The inner winding part 21 is arranged radially inside the stator lamination 11 in a winding receptacle 3. The outer winding part 22 is arranged radially outside the stator lamination 11 on an outer surface 4 of the laminated core 1.

The inner winding part 21 and the outer winding part 22 are connected to one another via a stator yoke. The respective winding receptacle 3 is formed as a groove. In addition, a soft-magnetic shield 5 is formed on the entire circumference around the outer winding part 22.

Six nonmagnetic connecting elements 6, which contact the stator lamination 11 and the soft-magnetic shield ring 5, are arranged between the stator lamination 11 and the soft-magnetic shield ring 5. The nonmagnetic connecting elements 6 are made of plastic. One of the nonmagnetic connecting element 6 is arranged in each case between adjacent winding poles 7 of the winding 2. In addition, the respective nonmagnetic connecting element 6 is arranged spaced apart from the respective adjacent winding poles 7 of the winding 2.

Because the following embodiments essentially have the same functional and/or structural features, only different features are discussed.

Figure 2:
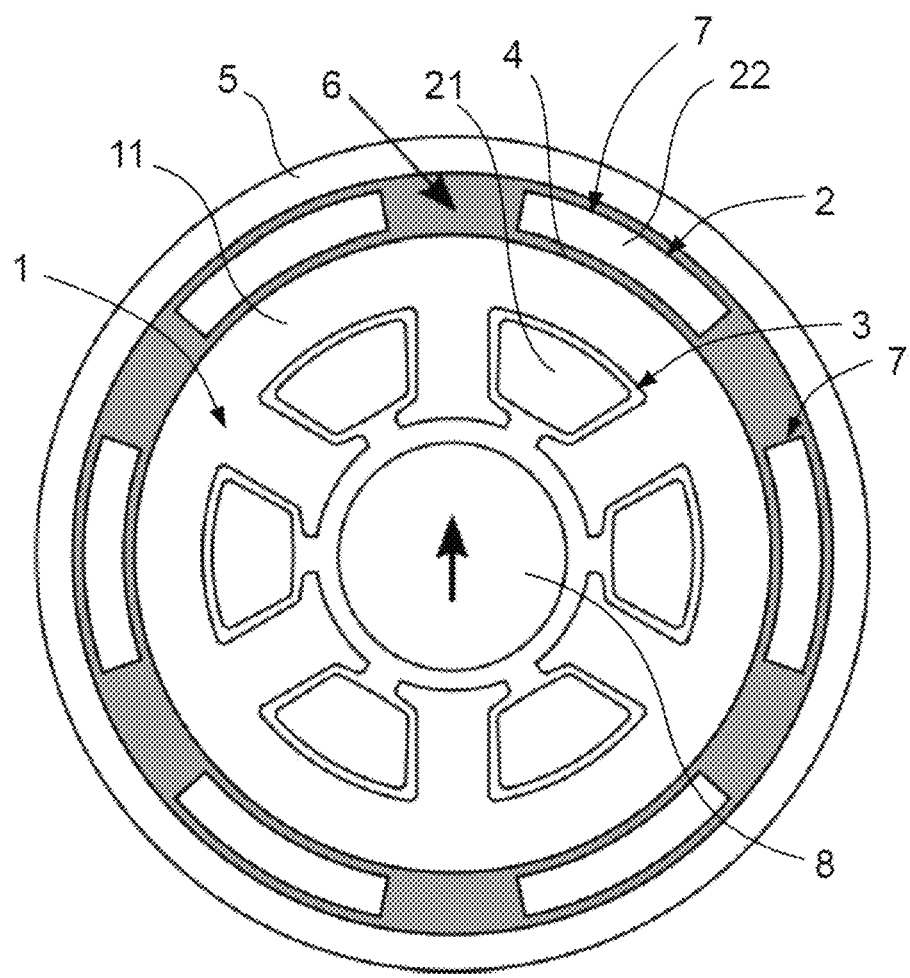
FIG. 2 is a further schematic sectional view of an induction machine/permanent-excited electric motor having a rotor and a 6-pole or 6-groove stator with a soft-magnetic shield and a nonmagnetic connecting element.

FIG. 2 shows a further schematic sectional view of an induction machine/permanent-excited electric motor with a rotor 8 and a 6-pole or 6-groove stator that includes a soft-magnetic shield 5 and a nonmagnetic connecting element 6. The yoke winding 2 of the stator is 6-poled or 6-grooved. The nonmagnetic connecting element 6 is a potting formed over the respective outer winding part 22. Furthermore, the respective winding receptacle 3 is formed as a groove.

Figure 3:
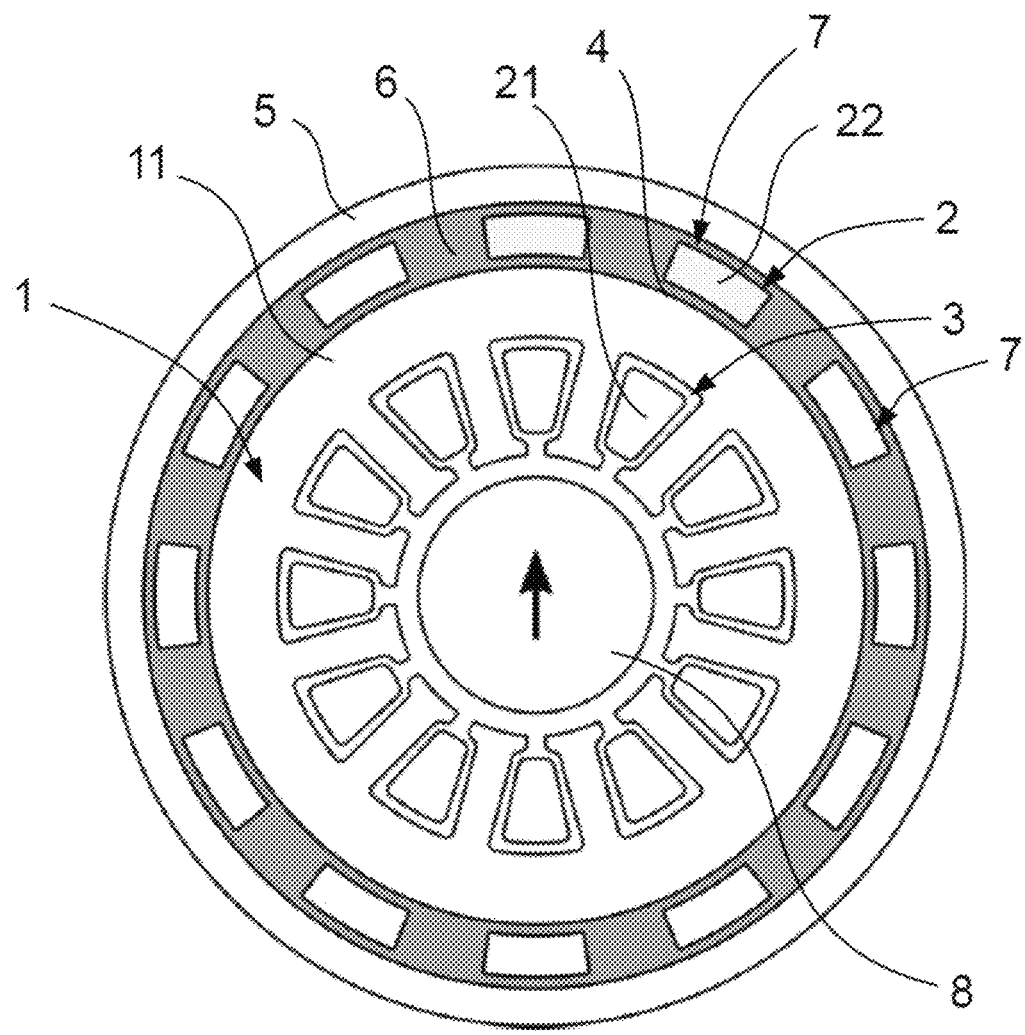
FIG. 3 is a schematic sectional view of an induction machine/permanent-excited electric motor with a rotor and a 12-pole or 12-groove stator with a soft-magnetic shield and a nonmagnetic connecting element.

FIG. 3 shows a schematic sectional view of an induction machine/permanent-excited electric motor with a rotor 8 and a 12-pole or 12-groove stator that includes a soft-magnetic shield 5 and a nonmagnetic connecting element 6. The respective winding receptacle 3 is formed here as a groove. The yoke winding 2 of the stator is formed 12-poled or 12-grooved.

Figure 4:
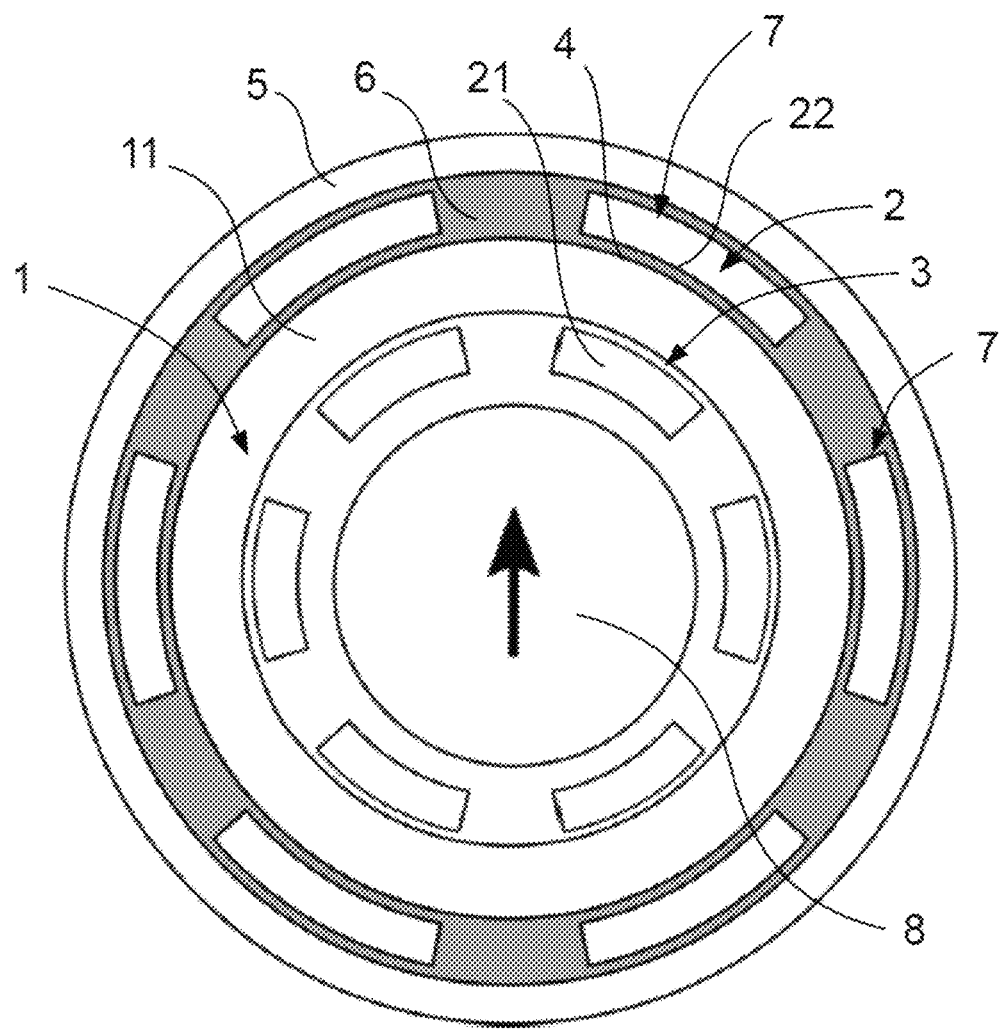
FIG. 4 is a further schematic sectional view of an induction machine/permanent-excited electric motor with a rotor and a 6-pole or 6-groove stator with a soft-magnetic shield and a nonmagnetic connecting element.

FIG. 4 shows a further schematic sectional view of an induction machine/permanent-excited electric motor with a rotor 8 and a 6-pole or 6-groove stator with a soft-magnetic shield 5 and a nonmagnetic connecting element 6. In the illustrated embodiment variant, the yoke winding 2 of the stator is made 6-poled or 6-grooved. The nonmagnetic connecting element 6 is a potting that is formed over the respective outer winding part 22. In addition, the respective winding receptacle 3 is formed without a groove.

Figure 5:
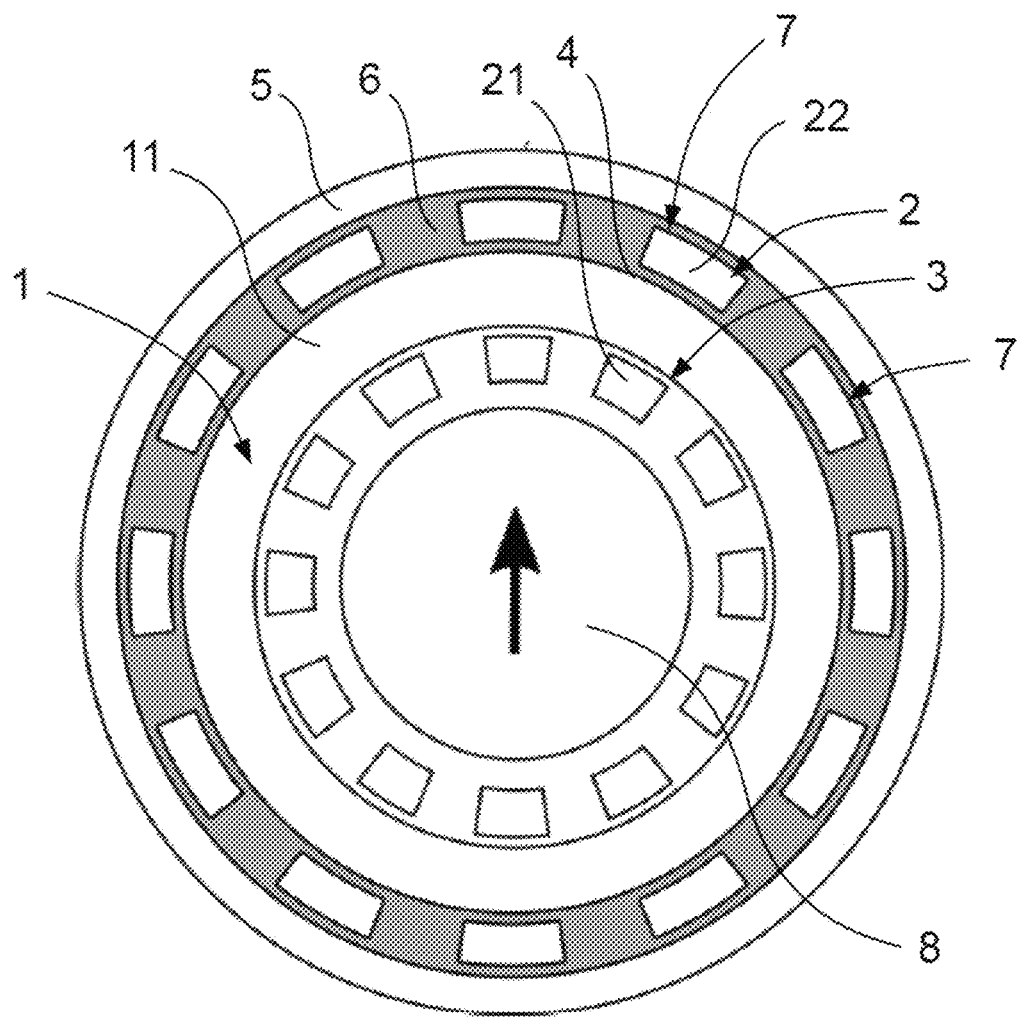
FIG. 5 is a further schematic sectional view of an induction machine/permanent-excited electric motor with a rotor and a 12-pole or 12-groove stator with a soft-magnetic shield and a nonmagnetic connecting element.

FIG. 5 shows a further schematic sectional view of an induction machine/permanent-excited electric motor with a rotor 8 and a 12-pole or 12-groove stator with a soft-magnetic shield 5 and a nonmagnetic connecting element 6. The yoke winding 2 of the stator is formed 12-poled or 6-grooved. The nonmagnetic connecting element 6 is a potting that is formed over the respective outer winding part 22. In addition, the respective winding receptacle 3 is formed without a groove.

The disclosure is not restricted in its embodiment to the preferred exemplary embodiments specified above. Rather, a number of variants is conceivable make use of the described solution even in fundamentally differently designed embodiments The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stator for a permanent-excited electric motor/induction machine with a laminated core made of stator laminations and a yoke winding, the yoke winding comprises:
    an inner winding part and an outer winding part, the inner winding part is arranged radially inside the stator lamination in at least one winding receptacle, the outer winding part is arranged radially outside the stator lamination on an outer surface of the laminated core;
    a soft-magnetic shield is formed on the entire circumference around the outer winding part; and
    at least one nonmagnetic connecting element, that contacts the stator lamination and the soft-magnetic shield, is arranged between the stator lamination and the soft-magnetic shield;
    the at least one nonmagnetic connecting element is made of plastic and the nonmagnetic connecting element is arranged in each case between adjacent winding poles of the yoke winding;
    the nonmagnetic connecting element is arranged spaced apart from the adjacent winding poles of the yoke winding.

2. The stator as claimed in claim 1, wherein the laminated core is integrally formed.

3. The stator as claimed in claim 1, wherein the at least one winding receptacle is formed as a groove.

4. The stator as claimed in claim 1, wherein the yoke winding is formed 6-poled or 6-grooved.

5. The stator as claimed in claim 1, wherein the yoke winding is formed 12-poled or 12-grooved.

6. An induction machine/permanent-excited electric motor with a stator as claimed in claim 1, wherein a rotor with permanent magnets is arranged inside the stator lamination.

7. The induction machine/permanent-excited electric motor as claimed in claim 6, wherein it is connected directly to a 2-stage inverter.

* * * * *